Oct. 22, 1968     A. POLLAK     3,406,487
BELT SANDERS
Filed March 12, 1965     2 Sheets-Sheet 1
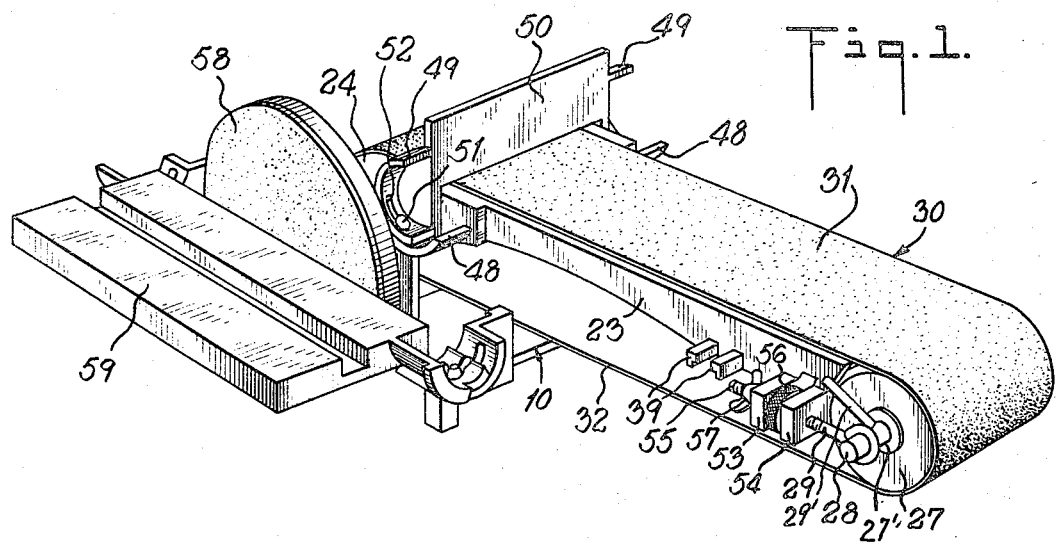
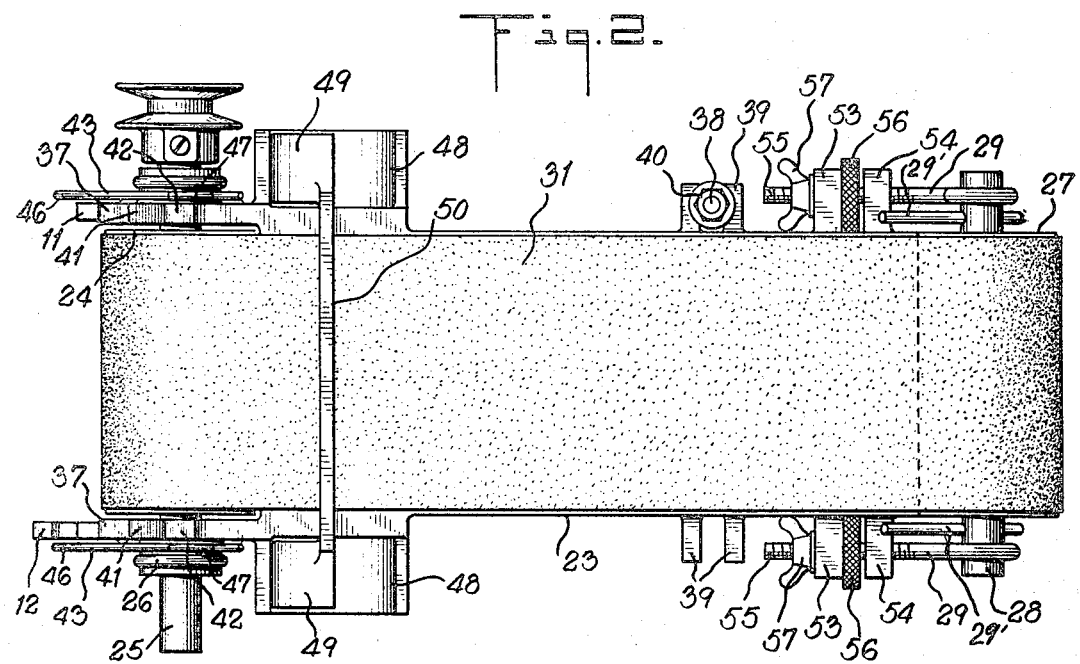
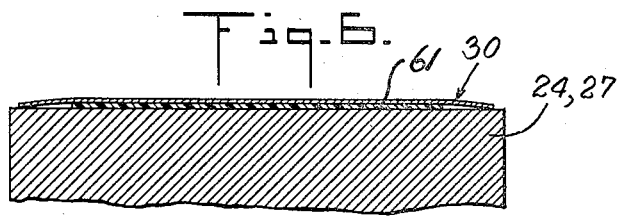
INVENTOR.
ABRAHAM POLLAK
BY
*Benj. T. Rauber*
ATTORNEY Oct. 22, 1968            A. POLLAK            3,406,487
                          BELT SANDERS
Filed March 12, 1965                          2 Sheets-Sheet 2
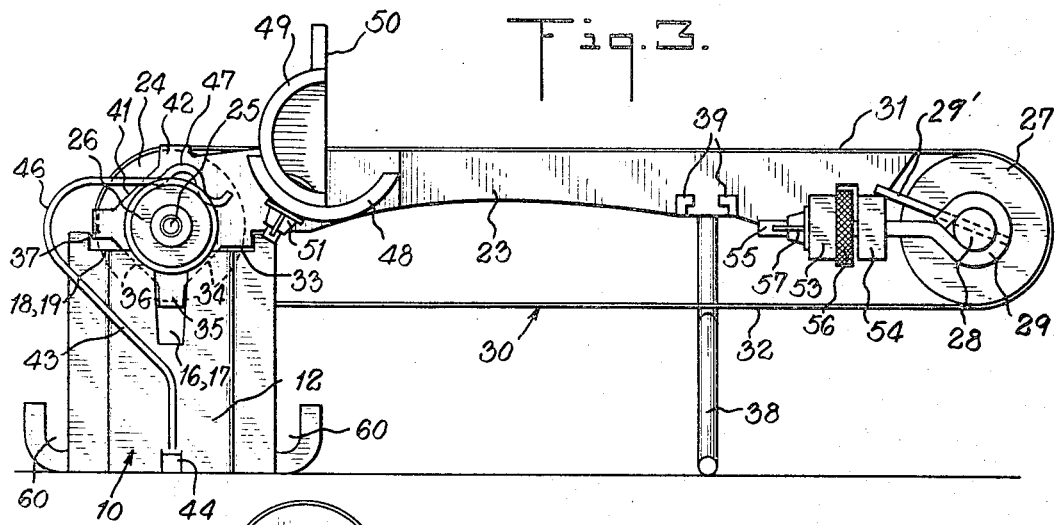
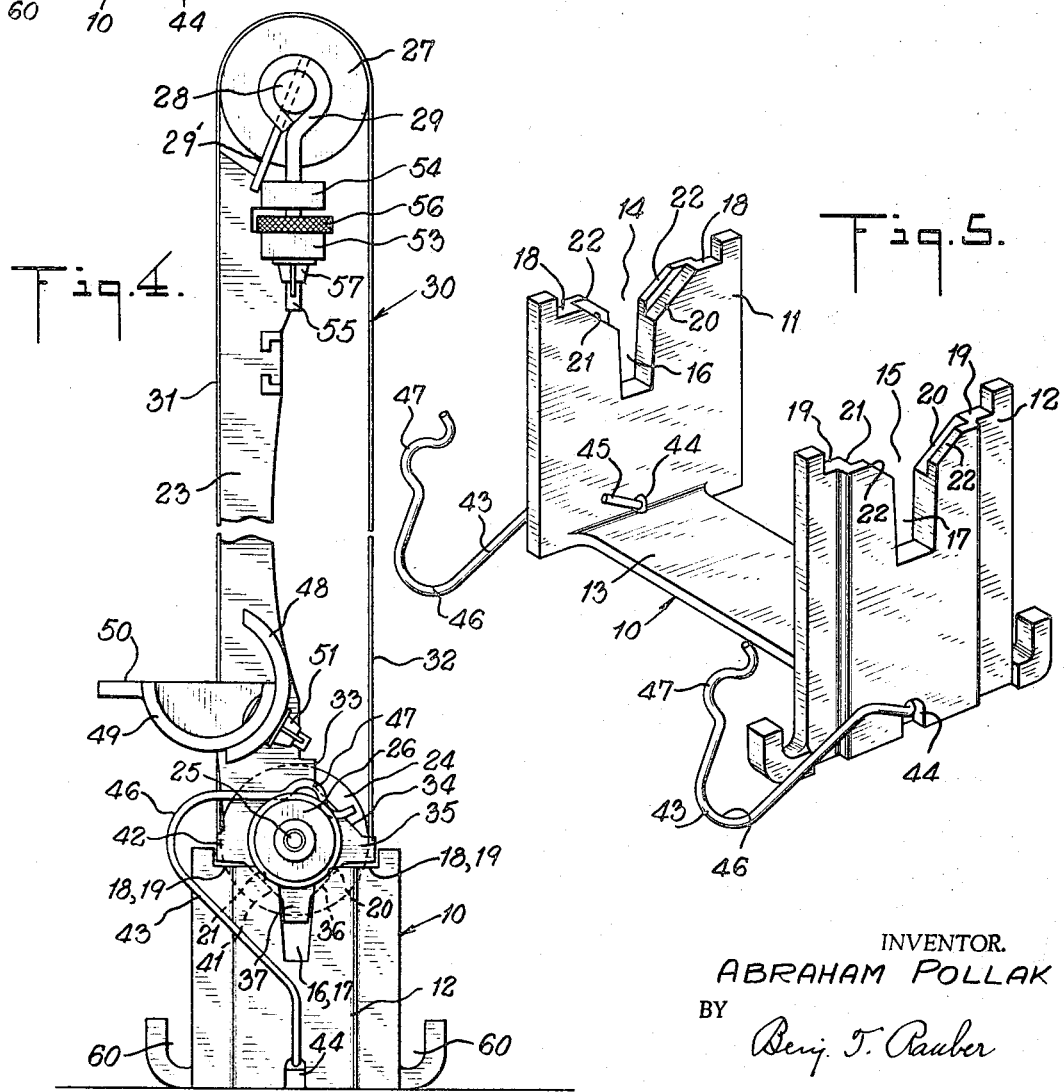
INVENTOR.
ABRAHAM POLLAK
BY Benj. T. Rauber
ATTORNEY

United States Patent Office 3,406,487
Patented Oct. 22, 1968

3,406,487
BELT SANDERS
Abraham Pollak, Fort Pierce, Fla. (% American Machine and Tool Company Inc., Royersford, Pa. 19468); Henry Martin Pollak and Robert Samuel Pollak, co-executors of said Abraham Pollak, deceased
Filed Mar. 12, 1965, Ser. No. 439,211
20 Claims. (Cl. 51—147)

ABSTRACT OF THE DISCLOSURE

A belt sander apparatus having a base for receiving a platen carrying a pair of tension-adjustable belt carrying pulleys. The platen is indexed to either a vertical or horizontal orientation.

My invention relates to belt-disc sanders or belt sanders designed for wood, plastic, or metal working.

The well engineered belt sander requires provision for three basic mechanical adjustments:

(1) method of adjusting tension on sanding belt;
(2) method of tracking the sanding belt; and
(3) method of changing belt from vertical to horizontal operating position.

In prior designs the methods used to accomplish these adjustments were costly and in some cases mechanically unsound.

In practically all common designs there is but one mechanism to accomplish the tension and tracking adjustments. In most cases it employs the use of two parallel slidable pins or screws attached in some manner at approximate right angles one each to the respective ends of the shaft carrying the adjustable belt roller. Since the pins or screws move in parallel but the belt roller shaft must be free to move not only at a constant angle to the pins for tension control but also at a variable angle to the pins for tracking control, the angle change has necessitated, on prior designs, an additional linkage, pivot, or costly machining operations to provide the motion and eliminate binding or twisting.

In my invention I employ a single mechanism to provide for the tension and tracking control. For the parallel moving slides or screws I use inexpensive eyebolts. The bolts are threaded through adjusting elements so that they can be adjusted to position and then locked in position. The shaft which holds the idler pulley passes through the eyes of the bolts.

Since the eyebolt is of round cross section, the shaft becomes tangent to the eye in a line on the inner circle. Because of this minimal contact it is possible to vary the position of the pulley shaft in the eye from a position at perfect right angle to the eyebolt to positions at a variable angle to the eyebolt without the necessity of any additional linkages or additional machining. Thus, since the tension on the idler pulley is always in one direction it is easy to adjust the tension on, and track, the idler pulley by simply moving either or both eyebolts in one direction or the other in their mounting.

In my construction I completely eliminate machine work or axles for pivoting but I still provide means for mounting the belt in a vertical or horizontal position. This is done by forming a seat in the base for mounting the belt that accepts a mating configuration from two positions on a platen (carrying the sander belt). Thus by simply inserting the platen in the base from either of two positions I achieve alternatively vertical or horizontal belt position.

With the drive belt from the motor in normal mounting position there is sufficient tension applied between platen casting and base casting to hold them rigidly together. For additional locking purposes I also supply two spring clips which are easily releasable when change of position is required.

With my design I accomplish all three of the necessary belt sander adjustments in a unique manner and a very inexpensive manner.

The various features of my invention are illustrated by way of example in the accompanying drawings in which:

FIG. 1 is approximately an isometric view of a belt sander embodying my invention with the belt in a horizontal position;

FIG. 2 is a plan of the belt sander as shown in FIG. 1;

FIG. 3 is a side elevation of a belt sander showing the sander belt in a horizontal position;

FIG. 4 is a side elevation of a belt sander showing the sanding belt in a vertical position;

FIG. 5 is an isometric view of a base on which a belt carrying platen is mounted, and FIG. 6 is a section of a part of a driving pulley for the sander belt.

Referring to the accompanying drawings, the belt sander of my invention comprises a base 10, shown more particularly in FIG. 5, having a pair of spaced uprights 11 and 12 joined by a cross piece 13 to provide a space to receive a sander belt platen. The uprights 11 and 12 shown in this specific embodiment are vertically flat parallel plates, each having a recess 14 and 15, and notches 16 and 17 respectively. The upper edges of the plates have horizontal surfaces 18 and 19 respectively, and in the embodiment illustrated each recess is formed of surfaces 20 and 21 extending downwardly at an angle of preferably 45° to the notches 16 and 17, the notches having substantially vertical side edges. Side flanges 22 may be provided at one side of the downwardly inclined surfaces 20 and 21. The recesses 14 and 15 and notches 16 and 17 and the horizontal surfaces 18 and 19 form a support for a sanding belt platen 23, positioned alternatively in either a horizontal or vertical position.

The sanding belt platen 23 for mounting in the base is shown more particularly in FIGS. 1, 2, 3 and 4. It has mounted at the end supported in the base a driving pulley 24 fixed on a shaft 25 journalled in a bearing 26. At the opposite end of the platen is an idler pulley 27 rotatable on an axle shaft 28 mounted on the platen by means of a pair of eyebolts 29, one at each side of the platen. The shaft 28 is held from rotating by pins 29' which abut a part of the frame. These pins serve to locate the idler pulley transversely. A belt 30 is trained about the pulleys 24 and 27 in an upper reach 31 supported by the platen 23 and a lower reach 32 below the platen 23. In operation the upper reach of the belt moves toward the driving pulley 24.

The platen 23 in its horizontal position shown in FIG. 3 is supported at the end carrying the driving pulley 24 by surfaces 34 and 36 resting on and complementary to the inclined surfaces 20 and 21 of the upright and retained within the flanges 22, and also held in position at each side by a projection 35 which extends into one of the notches 16 or 17. This positions and supports the driving end of the platen in the horizontal position. Further support for the platen in this position is provided by a supporting leg 38 extending downwardly from the platen at one side thereof and thence horizontally. As shown in FIG. 2 the leg 38 may be supported adjustably in a side bracket 39 and retained therein by a nut 40 to permit adjustment of the leg 38 to accommodate variations in the surface on which the platen is placed.

When the platen is mounted vertically as shown in FIG. 4, the inclined surface 36 rests on the inclined surface 20, the projections 37 extend into one of the notches 16 or 17, and inclined surfaces 41 in this position rest on the inclined surfaces 21.

It may be observed that in the horizontal position the projection 35 extends into the notches 16 and 17, and in the position shown in FIG. 4 the projection 37 extends into the notches 16 and 17, while the projection 35 has a flat horizontal surface above the horizontal surface 18 or 19. When mounted in either of these positions the platen may be held in position by a pair of spring clips 43, one at each side of the base, extending through a notch 44 in the bottom part of the base and having a part 45 inturned on the inner surfaces of the uprights 11 and 12 to retain the spring clips in position in the base as shown in FIG. 5 so that they may hold the platen in position as shown in FIG. 4 for the vertical position and for the horizontal position shown in FIGS. 3 and 1. The upper ends of the spring clips 43 are curved as at 46 and thence to a part 47 which in the locking position extends over and in engagement with a groove on the outer surface of the bearing 26. When moved to the position shown in FIGS. 3 and 4 the spring clips hold the end of the platen firmly onto the upper parts of the uprights 11 and 12. The bent part 46 of the spring clip gives the requisite amount of spring pressure and enables the spring clips to be grasped and turned counterclockwise as shown in FIGS. 3 and 4 to release the platen.

To change the platen from one position to the other, that is, from horizontal to vertical, or vice-versa, each spring clip 43 is grasped at 46 and swung out of engagement with the bearing part of the platen which is then left free to be again set into the recess either in horizontal or vertical position, whereupon the spring clip may be swung into engagement to hold the platen firmly in engagement with the base. This provides a very simple, inexpensive, construction in which the platen can readily be turned from horizontal to vertical position or from vertical to horizontal position.

Normally it is desirable to have a stop plate positioned to take the thrust of a workpiece caused by the drag of the sanding belt. For this purpose there is provided on each side of the platen a part circular bracket 48 on which may be supported a part circular projection 49 of a stop plate 50 which extends across the platen. The projection 49 may be secured on the bracket 48 by means of a bolt 51 passing through a slot 52, shown in FIG. 1. By loosening the bolt 51 the stop plate 50 may be adjusted to or from a vertical position and then secured by tightening the bolt.

Unless the belt is properly guided onto the driving pulley it shifts toward one end or the other of the pulley. The direction of guiding may be adjusted by an adjustment of the axis of the idler pulley 27 relative to the axis of the driving pulley, that is, by moving one end or the other of the idler pulley toward or from the axis of the driving pulley. For this purpose the threaded stem of each eye-bolt 29 extends through a pair of spaced brackets 53 and 54, one pair of brackets being secured on each side of the platen, and is threaded through a knurled nut 56 between the brackets of each pair. Each nut bears against its bracket 53 and the eye-bolt is moved in a direction away from the driving pulley. By turning the nuts separately in one direction or the other, the belt may be tautened and the axis of the pulley 27 adjusted to guide the belt onto the driving pulley 26 in centered position. A wing nut 57 is threaded onto each eye-bolt so that it may be brought up tightly against the adjacent side of the bracket 53 to hold the eyebolt in adjusted position. To hold the shaft 28 and bearing 27 from rotating, a radially extending pin 29' is secured on the shaft 28 in position to rest on the bracket 54. The eyebolts being of rounded cross section provide a tangential support for the shaft 28 so that the shaft, in adjusting to different positions, may move freely and without stress or strain on the eyebolts.

The end of the driving shaft 25 projects a substantial distance beyond the side edge of the platen to receive any one of a variety of tools, such, for example, as the sanding disc 58. A supporting bed 59 for supporting a workpiece 58 may be secured to the base by bolting in slots 60, as shown in FIG. 3.

As illustrated in the section of a portion of the driving pulley shown in FIG. 6, the mid portion of the pulleys 24 and 27 are encircled by a band 61 of resilient material cemented to each of the pulleys to provide in effect a resilient crown portion to hold the belt 30 in mid position on the pulleys.

What I claim is:

1. A belt sander which comprises a platen for a sanding belt and a supporting base for said platen, said base and said platen having parts interfitting to enable said platen to be mounted on said base alternatively in vertical and horizontal position, said interfitting parts comprising on one part an indexing recess and on the other part at least two indexing projections adapted to alternately interfit said recess when said platen is oriented in either a vertical or horizontal position and is fixedly held in either of said vertical or horizontal positions, and a driving pulley and an idler pulley for a sander belt on said platen.

2. The belt sander of claim 1 having a releasable spring clip to hold said interfitting parts in assembled positions.

3. The belt sander of claim 1 in which said driving pulley is mounted on said platen to have the axis of said driving pulley in the same position relative to said base in each of said alternative positions.

4. A belt sander which comprises a base having a space to receive an end of a sander belt carrying platen and having downwardly extending recesses on each side of said space to receive lateral projections of said platen, a sanding belt platen having an end insertable into said space and having lateral projections receivable in said recesses, said lateral projections having surfaces complementary to the edges of said recesses when said platen is in horizontal position and when it is in vertical position to hold said platen in either horizontal or vertical position, means mounted in said base and engaging said lateral projections to hold said extensions in said recesses in either vertical or horizontal position, a driving pulley at one end of said platen and an idler pulley at the opposite end thereof to mount an endless sander belt thereon.

5. The belt sander of claim 4 in which said platen has at least one flange adjacent to each recess to confine said end of said platen from sidewise shifting when mounted in said recesses.

6. The belt sander of claim 1 in which said base comprises a pair of spaced, approximated parallel, uprights to receive between them the end of said platen and in which said downwardly extending recesses are formed.

7. The belt sander of claim 6 in which each recess comprises a downwardly extending notch and in which said platen has a pair of extensions to fit into said notch alternatively when said platen is mounted in said base in horizontal position and in vertical position.

8. The belt sander of claim 7 in which said recess has at least one edge extending downwardly at an angle to said notch.

9. The belt sander of claim 4 in which said means to hold said lateral projections in position in said notches comprises at least one spring clip pivotally mounted in said base to tilt to a position to engage said platen and to tilt from engagement with said platen.

10. The belt sander of claim 4 in which said driving pulley is positioned at the end of said platen mountable on said base and said idler pulley is spaced from said driving pulley.

11. The belt sander of claim 10 comprising a bearing for said idler pulley and means to shift the ends of said bearing independently to adjusted distances from said driving pulley.

12. A belt sander which comprises a base having a pair of spaced uprights each having a downwardly extending recess and a notch extending vertically downwardly from each said recess, a platen having a fixed bearing, a driving pulley journalled in said bearing, an axle shaft spaced from said bearing, an idler pulley rotatably mounted on said axle shaft, said platen having at each side surfaces to fit into one of said recesses of said base when said platen is alternatively in a horizontal position and in a vertical position and projections to fit into said notches when said platen is alternatively in a vertical position and in a horizontal position, and resilient clips mounted on said base and movable to engage said platen resiliently to hold said side surfaces and projections in said recesses and notches respectively to hold said platen securely in its horizontal and in its vertical position.

13. The belt sander of claim 12 in which said spaced uprights comprise vertical parallel plates and in which said recesses are aligned on an axis at right angles to said plates.

14. The belt sander of claim 13 in which said platen has a rounded surface on each of a pair of lateral extensions for snug engagement by releasable spring clips, said clips having a portion curved to engage said rounded surface on each of said lateral extensions.

15. The belt sander of claim 14 in which said rounded projections are coaxial with said drive shaft.

16. The belt sander of claim 12 in which said recesses have surfaces extending at 45° to the horizontal to the respective notches of their respective plates and in which said platen has surfaces complementary to said surfaces.

17. The belt sander of claim 16 in which said notches have parallel vertical surfaces.

18. The belt sander of claim 12 comprising a pair of threaded eye-bolts one on each side of said platen and in which said axle shaft is mounted and a pair of brackets on each side of said platen having passages through which said eye-bolts extend and a nut threaded onto each eye-bolt between said spaced projections.

19. The belt sander of claim 12 comprising a stop plate mounted on and extending transversely above the upper reach of said platen.

20. The belt sander of claim 12 in which said driving roller has a cylindrical band of resilient material on and encircling the median part of said roller.

References Cited

UNITED STATES PATENTS

| | | | |
|---|---|---|---|
| 747,699 | 12/1903 | Gough | 51—147 |
| 2,145,418 | 1/1939 | Herchenrider | 51—141 |
| 2,470,615 | 5/1949 | Grover | 51—135 |
| 3,127,712 | 4/1964 | Krogen | 51—148 |

OTHER REFERENCES

Hammond catalog No. 75, Feb. 1, 1954, p. 7.

ROBERT C. RIORDON, *Primary Examiner.*

D. G. KELLY, *Assistant Examiner.*